United States Patent Office 3,684,593
Patented Aug. 15, 1972

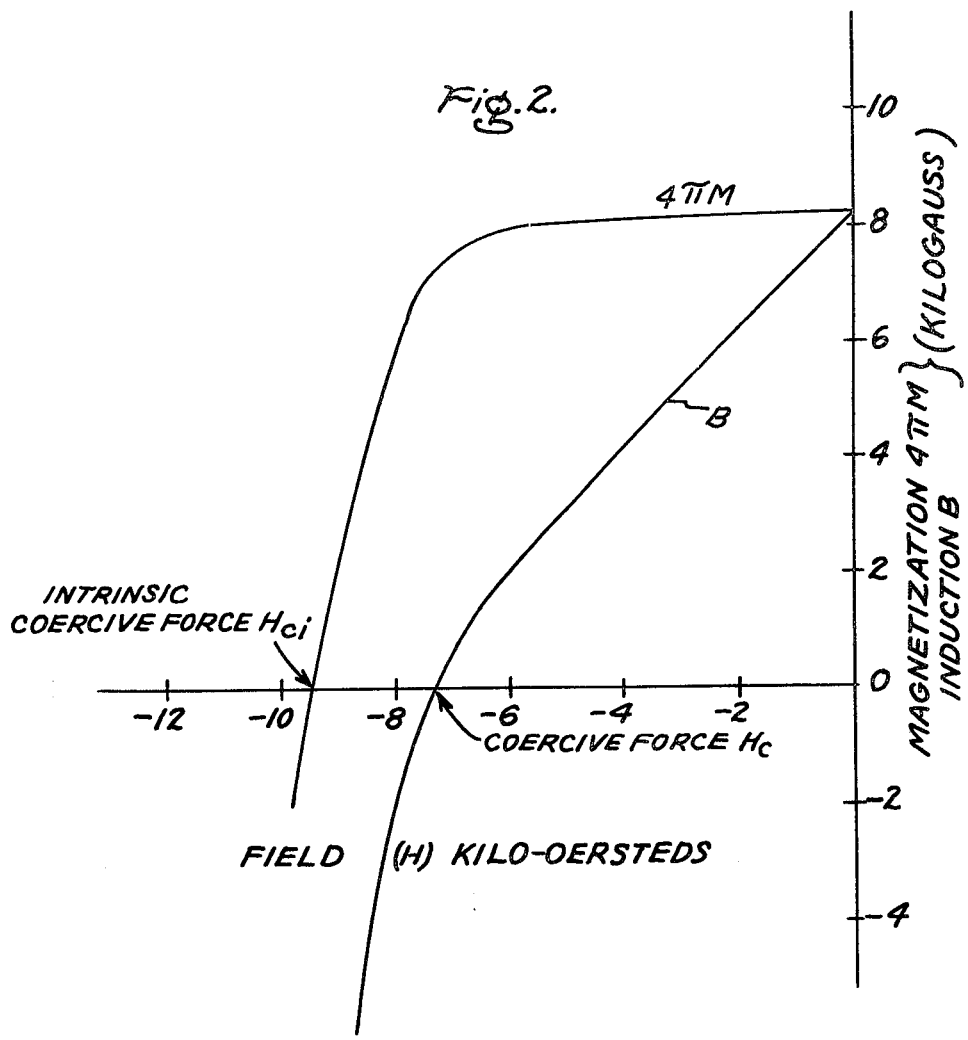

3,684,593
HEAT-AGED SINTERED COBALT-RARE EARTH INTERMETALLIC PRODUCT AND PROCESS
Mark G. Benz, Burnt Hills, and Donald L. Martin, Elnora, N.Y., assignors to General Electric Company
Continuation-in-part of application Ser. No. 33,315, Apr. 30, 1970. This application Nov. 2, 1970, Ser. No. 86,288
Int. Cl. H01f 1/06
U.S. Cl. 148—102                                    20 Claims

ABSTRACT OF THE DISCLOSURE

A process for preparing heat-aged novel sintered cobalt-rare earth intermetallic products which can be magnetized to form permanent magnets having stable improved magnetic properties. A sintered cobalt-rare earth metal product is provided which at its sintering temperature is a composition ranging from a single solid $Co_5R$ intermetallic phase to that composed of $Co_5R$ solid intermetallic phase and a second phase of solid CoR which is richer in rare earth metal content than the $Co_5R$ phase and which is present in an amount of up to about 30 percent by weight of the product. The sintered product is heated at a temperature within 400° C. below its sintering temperature to precipitate out of the $Co_5R$ phase a CoR phase richer in rare earth metal content than the $Co_5R$ phase in an amount sufficient to improve coercive force, either intrinsic and/or normal, of the product by at least 10 percent.

This application is a continuation-in-part of copending patent application Ser. No. 33,315 filed Apr. 30, 1970, now abandoned.

The present invention relates generally to the art of permanent magnets and is more particularly concerned with novel sintered cobalt-rare earth intermetallic products having unique characteristics and with a sintering method for producing such products.

Permanent magnets, i.e. "hard" magnetic materials such as the cobalt-rare earth intermetallic compounds, are of technological importance because they can maintain a high, constant magnetic flux in the absence of an exciting magnetic field or electrical current to bring about such a field.

Cobalt-rare earth intermetallic compounds exist in a variety of phases, but the $Co_5R$ intermetallic single phase compounds (in each occurrence R designates a rare earth metal) have exhibited the best magnetic properties. The permanent magnet properties of bulk $Co_5R$, as well as cobalt-rare earth intermetallic magnetic materials generally, can be enhanced by reducing the bulk bodies to powders, but in such finely-divided form these materials are unstable in air and their magnetic properties deteriorate after a short period of time.

It is an object of the present invention to provide cobalt-rare earth intermetallic magnets which have superior magnetic properties and are stable in air.

Those skilled in the art will gain a further and better understanding of the present invention from the detailed description set forth below, considered in conjunction with the figures accompanying and forming a part of the specification, in which:

FIG. 2 is a graphical representation showing demagnetization curves for the heat-aged sintered product of Example 2 wherein the abscissa of the graph is the magnetic field (H) in kilo-oersteds and the ordinate is induction (B) for one curve or magnetization $4\pi M$ for the second curve in kilo-gauss.

Figure 1:
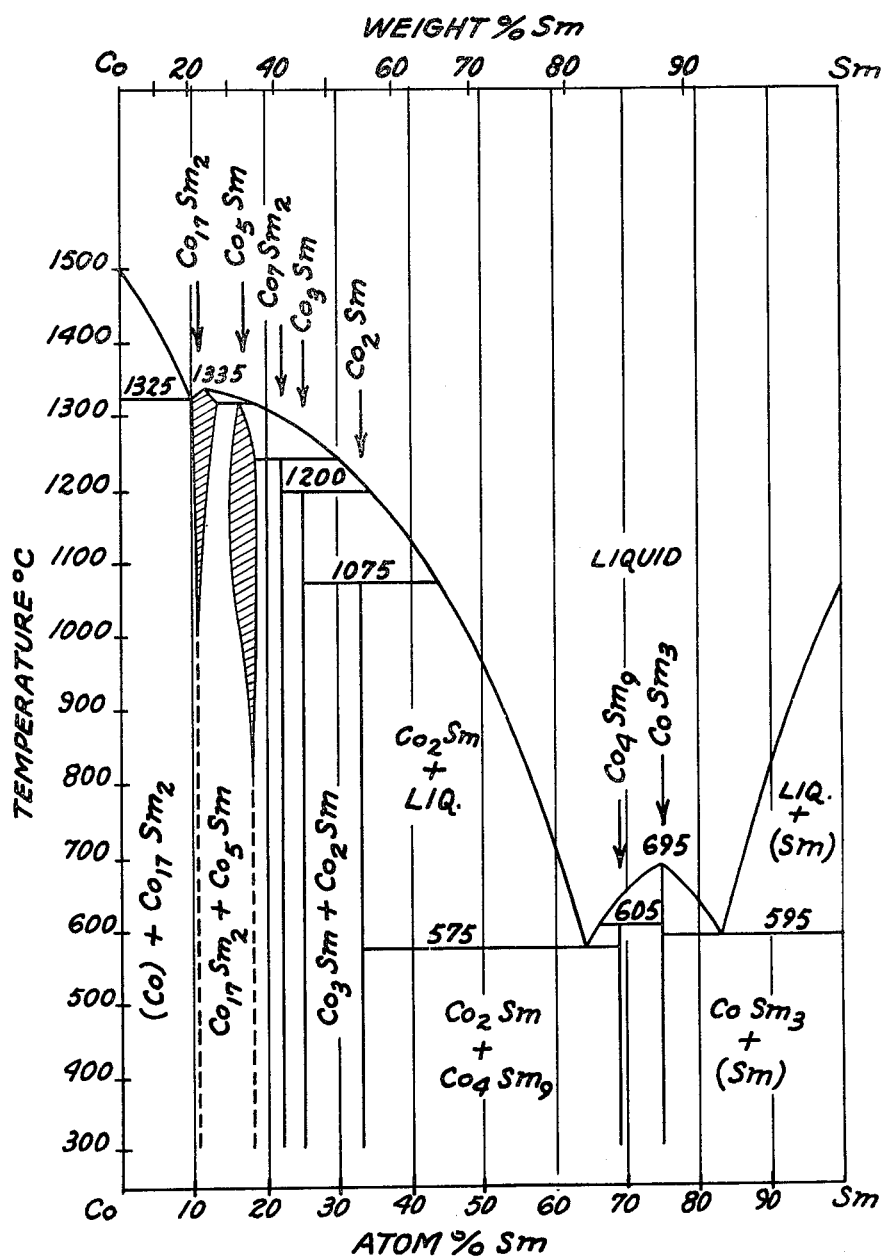
FIG. 1 is the cobalt-samarium phase diagram. It is assumed herein, that the phase diagram at 300° C., which is the lowest temperature shown in the figure, is substantially the same at room temperatures.

Briefly stated, the process of the present invention comprises the steps of forming a sintered cobalt-rare earth intermetallic product composed of $Co_5R$ intermetallic phase, and heat-aging said product to precipitate out of the $Co_5R$ phase a CoR phase richer in rare earth metal content than the $Co_5R$ phase to increase either its intrinsic coercive force $H_{ci}$ and/or normal coercive force $H_c$ by at least 10 percent. As used herein, the intrinsic coercive force $H_{ci}$ is the field strength at which the magnetization $(B-H)$ or $4\pi M$ is zero. On the other hand, normal coercive force $H_c$ is the field strength at which the induction B becomes zero. The maximum energy product $(BH)_{max}$ represents the maximum product of the magnetic field H and the induction B determined on the demagnetization curve.

The sintered product used in the present invention ranges at sintering temperature from a single solid $Co_5R$ intermetallic phase to that composed of $Co_5R$ phase and a second phase of solid CoR which is richer in rare earth metal content than the $Co_5R$ phase and which is present in an amount up to about 30 percent by weight of the product. In the present heat-aging step, there is precipitated out of the $Co_5R$ phase, i.e. out of solid solution, a CoR phase richer in rare earth metal content than the $Co_5R$ phase in an amount sufficient to increase the intrinsic coercive force and/or normal coercive force, of the sintered product by at least 10 percent. As can be seen from FIG. 1 which is a phase diagram for cobalt-samarium, when the sintered product is composed of $Co_5R$ phase it must be of a composition fairly close to the boundary or solution line defining the single solid $Co_5R$ intermetallic phase on the rare earth rich side in order to undergo precipitation in the present aging process. Specifically, in the present heat-aging step, the $Co_5R$ phase must pass through the phase boundary or solution line from the single phase region to the two phase region in an amount which precipitates the CoR phase sufficiently to increase the intrinsic and/or normal coercive force of the product by at least 10 percent. Likewise, in heat-aging the sintered product composed of $Co_5R$ phase and CoR phase, a sufficient portion of the $Co_5R$ phase must pass from the single phase to the two phase region to precipitate the CoR phase in an amount which increases the coercive force intrinsic and/or normal, by at least 10 percent. For such an increase in intrinsic coercive force, the CoR phase should be precipitated in a minimum amount of at least about 1 to 5 percent by weight of the sintered product. There is no specific limitation on the maximum amount of precipitated CoR phase since the intrinsic and/or normal coercive force of the heat-aged product appears to increase with increasing amounts of precipitated CoR. Generally, however, the present process is capable of precipitating the CoR phase up to about 10 to 15 percent by weight of the product.

The present heat-aging process is essentially a solid state precipitation process whereby the precipitated CoR phase is produced by a nucleation and growth process. In some instances, the precipitated phase may not be detected readily but its presence is reflected in the significant increase in the intrinsic and/or normal coercive force obtainable in the sintered product. However, the precipitated CoR phase is detectable by metallographic techniques such as by means of an electron microscope.

Sintered products useful in the present invention are disclosed in copending U.S. patent applications Ser. No. 33,347, Ser. No. 33,348 and Ser. No. 33,224 all filed of even date herewith in the name of Mark G. Benz, and assigned to the assignee hereof, and all of which by reference are made part of the disclosure of the present application.

Each of the aforementioned copending patent applications discloses a process for preparing novel sintered cobalt-rare earth intermetallic products which can be magnetized to form permanent magnets having stable improved magnetic properties.

Briefly stated, in U.S. patent application Ser. No. 33,347 a particulate mixture of a base CoR alloy and an additive CoR alloy, where R is a rare earth metal or metals is sintered to produce a product having a composition lying outside the $Co_5R$ single phase on the rare earth richer side. Specifically, the base alloy is one which at sintering temperature exists as a solid $Co_5R$ intermetallic single phase. Since the $Co_5R$ single phase may vary in composition, the base alloy may vary in composition which can be determined from the phase diagram for the particular cobalt-rare earth system, or empirically. The additive cobalt-rare earth alloy is richer in rare metal than the base alloy and at sintering temperature it is at least partly in liquid form and thus increases the sintering rate. The additive alloy may vary in composition and can be determined from the phase diagram for the particular cobalt-rare earth system or it can be determined empirically.

The base and additive alloys, in particulate form, are each used in an amount to form a mixture which has a cobalt and rare earth metal content substantially corresponding to that of the final desired sintered product since sintering causes little or no loss of these components. The additive alloy should be used in an amount sufficient to promote sintering, and generally, should be used in an amount of at least 0.5 percent by weight of the base-additive alloy mixture. The particulate mixture is compressed into a green body of the desired size and density. Preferably, the particles are magnetically aligned along their easy axis prior to or during compression since the greater their magnetic alignment, the better are the resulting magnetic properties.

The green body is sintered in a substantially inert atmosphere to produce a sintered body of desired density. Preferably, the green body is sintered to produce a sintered body wherein the pores are substantially noninterconnecting, which generally is a sintered body having a density of at least about 87 percent of theoretical. Such noninterconnectivity stabilizes the permanent magnet properties of the product because the interior of the sintered product or magnet is protected against exposure to the ambient atmosphere. Such non-interconnectivity is determinable by standard metallographic techniques, as for example, by means of transmission electron micrographs of a cross-section of the sintered product.

Sintering temperature depends largely on the particular cobalt-rare earth intermetallic material to be sintered, but it must be sufficiently high to coalesce the component particles. Preferably, sintering is carried out so that the pores in the sintered product are substantially non-interconnecting. For cobalt-samarium alloys a sintering temperature ranging from about 950° C. to about 1200° C. is suitable with a sintering temperature of 1100° C. being particularly satisfactory.

The density of the sintered product may vary. The particular density depends largely on the particular permanent magnet properties desired. Preferably, to obtain a product with substantially stable permanent magnet properties, the density of the sintered product should be one wherein the pores are substantially non-interconnecting and this occurs usually at a density or packing of about 87 percent. Generally, for a number of applications, the density of the sintered product may range from about 80 percent to 100 percent. For example, for low temperature applications, a sintered body having a density ranging down to about 80 percent may be satisfactory.

The procedure for forming sintered products disclosed in U.S. patent application Ser. No. 33,348 is substantially the same as that disclosed in U.S. patent application Ser. No. 33,347 except that an additive CoR alloy which is solid at sintering temperature and which is richer in rare earth metal than the base alloy is used.

The procedure for forming the sintered products disclosed in U.S. patent application Ser. No. 33,224 is substantially the same as that disclosed in U.S. patent application Ser. No. 33,347 except that a cobalt-rare earth metal alloy of proper composition is initially formed.

When used in the present heat-aging process, the sintered products of the referred to copending patent applications contain a major amount of the $Co_5R$ solid intermetallic phase, generally at least about 70 percent by weight of the product, and a second solid CoR intermetallic phase which is richer in rare earth metal content than the $Co_5R$ phase and which is present in an amount of up to about 30 percent by weight of the product. Traces of other cobalt-rare earth intermetallic phases, in most instances less than one percent by weight of the product, may also be present.

In the present heat-aging process, a sintered product which at sintering temperature is composed only of $Co_5R$ intermetallic phase is also useful and preferred. This particular single phase product must be of a composition at sintering temperature fairly close to the boundary or solution line defining the single solid $Co_5R$ phase on the rare earth rich side. Specifically, to be useful in the present process this single $Co_5R$ phase sintered product must pass through the phase boundary from the single phase region to the two-phase region in an amount which precipitates the CoR phase sufficiently to increase the coercive force of the product by at least 10 percent. The particular alloy composition for forming a sintered product which is a single $Co_5R$ phase at sintering temperature and which is useful in the present heat-aging process can be determined from the phase diagram for the particular cobalt-rare earth metal system or it can be determined empirically. For example, referring to FIG. 1 for cobalt-samarium, a cobalt-samarium alloy having a content of about 35.5 to 36.5 percent by weight samarium is the preferred composition which can be used to form a sintered product which is a single $Co_5Sm$ phase at a sintering temperature of about 1100° C. The alloy composition used in forming a sintered product composed of single $Co_5R$ phase can be prepared in the same manner disclosed in U.S. patent applications Ser. Nos. 33,347 and 33,348 except that in this instance the base and additive alloy mixture is formed to have a cobalt and rare earth metal content which results in a sintered product which is a single $Co_5R$ phase at sintering temperature. Likewise, the cobalt-rare earth metal alloy can be prepared initially to be a single $Co_5R$ phase at sintering temperature.

The rare earth metals useful in preparing the cobalt-rare earth alloys and intermetallic compounds used in forming the sintered products are the 15 elements of the lanthanide series having atomic numbers 57 to 71 inclusive. The element yttrium (atomic number 39) is commonly included in this group of metals and, in this specification, is considered a rare earth metal. A plurality of rare earth metals can also be used to form the present desired cobalt-rare earth alloys or intermetallic compounds which, for example may be ternary, quaternary or which may contain an even greater number of rare earth metals as desired.

Representative of the cobalt-rare earth alloys useful in forming the sintered products are cobalt-cerium, cobalt-praseodymium, cobalt-neodymium, cobalt-promethium, cobalt-samarium, cobalt-europium, cobalt-gadolinium, cobalt-terbium, cobalt-dysprosium, cobalt-holmium, cobalt-erbium, cobalt-thulium, cobalt-ytterbium, cobalt-lutecium, cobalt-yttrium, cobalt-lanthanum and cobalt-misch metal. Misch metal is the most common alloy of the rare earth metals which contains the metals in the approximate ratio in which they occur in their most common naturally occurring ores. Examples of specific ternary alloys include cobalt-samarium-misch metal, cobalt-cerium-praseodymium, cobalt-yttrium-praseodymium, and cobalt-praseodymium-misch metal.

The present heat-aging process makes possible a wide variation in particle size of the cobalt-rare earth alloys used for sintering. Specifically, the particles can be in as finely divided a form as desired. For most applications, average particle size will range about 1 micron or less to about 10 microns. Larger sized particles can be used, but as the particle size is increased, the maximum coercive force obtainable is lower because the coercive force of the sintered body generally varies inversely with particle size. However, even though larger size particles result in a sintered body, with a lower obtainable intrinsic coercive force, the present heat-aging process is operable to increase the coercive force of such a sintered body by at least 10 percent.

A particular advantage of the present heat-aging process is that it makes high density sintered products available as permanent magnets for a much wider variety of uses. Specifically, in the past, high density sintered products, particularly those having a density above about 92%, have been characterized by high magnetic stability and high flux but an intrinsic coercive force which was too low for most applications. The present process increases the intrinsic and/or normal coercive force of these high density products by at least 10% or more without any significant decrease in flux.

The sintered product is heat-aged at a temperature within 400° C. below its sintering temperature and preferably within 300 to 100° C. below its sintering temperature. Heat-aging is carried out in an atmosphere such as argon in which the material is substantially inert. The particular temperature at which the material is heat-aged is determinable empirically. For example, the sintered product may be initially magnetized and its magnetic properties determined. It is then heated at a temperature below its sintering temperature, generally about 100° C. below its sintering temperature for a period of time, for example about 3 hours or longer, and thereafter, allowed to cool to room temperature and magnetized in the same manner and its magnetic properties determined. This procedure may be repeated at successively lower temperatures until a temperature is found at which the magnetic properties, i.e. intrinsic and/or normal coercive force, of the product show a marked improvement. The product can then be further aged at such temperature to increase the coercive force. Once the particular heat-aging temperature is determined for a particular system, the sintered product can be heat-aged immediately after sintering, if desired, simply by lowering the furnace temperature, i.e. furnace cooling, to the desired heat-aging temperature.

Heat-aging by furnace cooling to the desired aging temperature is preferred. It requires a shorter period of time and generally produces a product with an intrinsic and/or normal coercive force significantly higher than that produced by the technique of initially cooling the sintered product to room temperature and then heating it up to the proper heat-aging temperature. For best results, the rate of furnace cooling should be slow with the particular furnace cooling rate being determinable empirically. Preferably, the furnace cooling rate may range from about 0.1 to 20° C. per minute depending largely on the particular cobalt-rare earth alloy used. In addition, the rate of furnace cooling may be carried out in a continuous manner or, if desired, by step cooling.

When magnetized, the heat-aged sintered product of the present invention is useful as a permanent magnet. The resulting permanent magnet is substantially stable in air and has a wide variety of uses. For example, the permanent magnets of the present invention are useful in telephones, electric clocks, radios, television, and phonographs. They are also useful in portable appliances, and as electric toothbrushes and electric knives, and to operate automobile accessories. In industrial equipment, the present permanent magnets can be used in such diverse applications as meters and instruments, magnetic separators, computers and microwave devices.

If desired, the sintered bulk product of the present invention can be crushed to a desired particle size preferably a powder, which is particularly suitable for alignment and matrix bonding to give a stable permanent magnet. The matrix material may vary widely and may be plastic, rubber or metal such as, for example, lead, tin, zinc, copper or aluminum. The powder-containing matrix can be cast, pressed or extruded to form the desired permanent magnet.

All parts and percentages used herein are by weight unless otherwise noted.

The invention is further illustrated by the following examples in which, unless otherwise noted, the conditions and procedure were as follows:

The aligning magnetizing field was used to magnetically align along the easy axis.

The sintering furnace was a ceramic tube.

All sintering was carried out in an inert atmosphere of purified argon and upon completion of the sintering, the sintered product was cooled in the same purified argon atmosphere.

Particle size was determined by a standard metallographic method.

The density of the green body as well as the sintered product is given as packing. Packing is the relative density of the material, i.e. it is a percent of theoretical. Packing was determined by a standard method using the following equation:

$$\frac{\frac{\text{Weight}}{\text{Volume}}}{8.5 \text{ g./cc.}} \times 100 = \text{Percent Packing}$$

where 8.5 g./cc. is the density of $Co_5Sm$.

All heating, heat-aging and cooling was carried out in an inert atmosphere of purified argon.

EXAMPLE 1

A base alloy melt and an additive alloy melt of cobalt-samarium were made under purified argon by arc-melting and cast into ingots. The base alloy was formed from 33.3 weight percent samarium and 66.7 weight percent cobalt. The additive alloy was formed from 60 weight percent samarium and 40 weight percent cobalt. Each ingot was initially crushed by means of mortar pestle and then reduced by fluid energy "jet" milling to a powder ranging in size from approximately 1 to 10 microns in diameter and generally had an average particle size of about 6 microns.

30.0 grams of the base alloy were admixed with 6.42 grams of the additive alloy to form a mixture composed of 62.6 by weight cobalt and 37.4 by weight samarium.

A portion of the mixture was placed in a rubber tube and magnetically aligned therein by an aligning magnetizing field of 60 kilo-oersteds provided by an electromagnet. After magnetic alignment, the tube was evacuated to freeze the alignment and then it was pressed hydrostatically under a pressure of 200K p.s.i. to form the green body. The green body weighed 14.32 grams and was in the shape of a bar 1.521 inches long and .325 inch in diameter and had a packing of 81.7 percent.

It was sintered at a temperature of 1100° C. for ½ hour.

The sintered product weighed 14.32 grams which indicates no loss in the cobalt and samarium components. As can be seen from FIG. 1, the phase diagram for cobalt-samarium, a sintered product having a composition of 62.6% by weight cobalt and 37.4% by weight samarium lies just outside the single $Co_5Sm$ phase boundary. Metallographic examination of another sintered product, which had been sintered from the same composition in the same manner, showed two phases present, and material deposits in a number of pores that appear to have been liquid at high temperatures. The sintered bar had a density of 7.5 grams/cc. which is equivalent to 88.3% of 8.5 grams/cc. After magnetization at room temperatures in a field of 100 kilo-oersteds, it had a remanent induction $B_r$ of 8000 gauss, an intrinsic coercive force $H_{ci}$ of —17,000 oersteds, a normal coercive force $H_c$ of —7100 oersteds and a maximum energy product $(BH)_{max}$ of $14.7 \times 10^6$ gauss-oersteds.

The bar was again sintered at 1100° C. for a period of 20 hours. The resulting bar had increased in density to 7.83 grams/cc. which is a packing of 92%. After being magnetized at room temperatures in a magnetizing field of 100 kilo-oersteds, the bar showed an increase in remanent induction $B_r$ to 8790 gauss but a decrease in intrinsic coercive force $H_{ci}$ to —10,500 oersteds, and a decrease in normal coercive force $H_c$ to —6900 oersteds.

The bar was then aged at a temperature of 1000° C. for a period of 16 hours. After magnetization at room temperature in a field of 100 kilo-oersteds, the heat-aged bar showed the same remanent induction $B_r$ but an intrinsic coercive force $H_{ci}$ of —18,000 oersteds.

The bar was then aged at a temperature of 900° C. for 17¼ hours. After magnetization at room temperatures in a magnetizing field of 100 kilo-oersteds, its intrinsic coercive force $H_{ci}$ was —23,400 oersteds, its normal coercive force $H_c$ was —7800 oersteds, and its maximum energy product $(BH)_{max}$ was $17.2 \times 10^6$ gauss-oersteds. The high intrinsic coercive force $H_{ci}$ of this permanent magnet illustrates the high resistance of the present magnets to demagnetizing fields. In addition, the increased maximum energy product indicates the increased area under the magnetization curve.

As can be seen from FIG. 1, at a temperature of 900° C. a portion of $Co_5Sm$ phase passes from the single phase region to the two-phase region which, in the present example, was in an amount which precipitated the $Co_7Sm_2$ phase sufficiently to significantly increase the magnetic properties of the magnet.

This example illustrates that the present heat-aging process is useful not only to recoup magnetic properties lost in sintering to high densities due to grain growth but also to produce high density magnets with superior magnetic properties.

EXAMPLE 2

A base alloy melt and an additive alloy melt were formed under purified argon by arc-melting and were cast into ingots. The base alloy was formed from 68 weight percent cobalt, 16 weight percent samarium and 16 weight percent cerium-misch metal. The additive alloy was formed from 40.8 weight percent cobalt and 59.2 weight percent samarium. Each ingot was formed into a powder in the same manner as disclosed as in Example 1 ranging in size from approximately 1 to about 10 microns in diameter with an average size of about 6 microns.

49.84 grams of the base alloy were admixed with 6.16 grams of the additive alloy by tumbling to form a substantially thorough mixture of 64.3 weight percent cobalt and 35.7 weight percent rare earth.

A portion of the mixture was placed in a rubber tube and magnetically aligned therein by an aligning magnetizing field of 60 kilo-oersteds and then compressed under a pressure of 200K p.s.i. to form a bar which weighed 8.1297 grams. It was 0.296 inch in diameter, 1.082 inches long and had a packing of 80 percent. The bar was sintered for ½ hour at a temperature of 1100° C. The sintered bar had a 0.276 inch diameter, a length of 1.010 inches and a density of 8.21 grams/cc. which is a packing of 96.6 percent. The bar weighed 8.1297 grams which indicated that none of the material was lost during sintering. As can be seen from FIG. 1, assuming that cerium-misch metal is substantially the equivalent of samarium, the sintered product having a composition of 64.3 percent by weight cobalt and 35.7 percent by weight rare earth metal of samarium-cerium misch metal is composed of single phase $Co_5$ rare earth metal.

After the sintered bar was magnetized at room temperatures in a field of 17.5 kilo-oersteds, it had an intrinsic coercive force $H_{ci}$ of —2050 oersteds and an open circuit induction $B_o$ of 7686 gauss in a self-demagnetizing field of —365 oersteds.

The sintered bar was aged at a temperature of 1000° C. for 3 hours. After such aging its dimensions were determined to be unchanged. After the bar was magnetized at room temperature in a field of 17.4 kilo-oersteds, it had an intrinsic coercive force $H_{ci}$ of —3100 oersteds and an open circuit induction $B_o$ of 7729 gauss showing some improvement in magnetic properties. The bar was then aged at 1000° C.. for a period of 19 hours. After it was magnetized at room temperature in a field of 18 kilo-oersteds, it had an intrinsic coercive force $H_{ci}$ of —3600 oersteds and an open circuit induction $B_o$ of 7744 gauss.

The bar was then aged at a temperature of 900° C. for a period of 16 hours. After it was magnetized at room temperature in a magnetizing field of 16.8 kilo-oersteds, it showed a significant improvement in magnetic properties, namely an intrinsic coercive force $H_{ci}$ of 8600 oersteds and an open circuit induction $B_o$ of 7761 gauss. The dimensions of the bar were determined and found to be unchanged.

After this heat-aged sintered bar was magnetized at room temperatures in a magnetizing field of 100,000 oersteds, it had the following properties.

Maximum energy product: $(BH)_{max} = 16 \times 10^6$ g.-oe.
Saturation induction: $B_s = 9145$ gauss
Remanent induction: $B_r = 8225$ gauss
Open circuit induction: $B_o = 7853$ gauss
Coercive force: $H_c = -7300$ oersteds
Intrinsic coercive force: $H_{ci} = -9450$ oersteds
Alignment factor $= .93$ It also had a density of 8.21 g./cc. which is equivalent to 96.6% of 8.5 g./cc.

FIG. 2 shows the increased intrinsic coercive force produced by the present heat-aging process as well as the increased magnitude of the field as defined by the curve $4\pi M$ versus magnetic field H.

This bar was further aged at a temperature of 800° C. for 16 hours. After being magnetized at room temperatures in a magnetizing field of 17.8 kilo-oersteds, it had an intrinsic coercive force $H_{ci}$ of —11,100 oersteds.

EXAMPLE 3

In this example, the stability of the magnetic properties of the magnetic product prepared in Example 2 was determined. After four months in air at room temperatures, its intrinsic coercive force $H_{ci}$ was determined and found to be unchanged.

EXAMPLE 4

A base alloy was formed from 15.9% by weight praseodymium, 18.3% by weight samarium and 65.8% by weight cobalt. An additive alloy was formed from 80.8% by weight cobalt and 59.2% by weight samarium. The base and additive alloys were each in the form of a powder and were blended to a composition of about 64% by weight cobalt. The blend was placed in a rubber tube and magnetically aligned therein by an aligning magnetizing field of 100 kilo-oersteds. After magnetic alignment, the tube was evacuated to freeze the alignment and then it was hydrostatically pressed under a pressure of 200K p.s.i. to form a bar. The bar was sintered at a temperature of 1100° C. for ½ hour. The sintered bar had a packing of 95%. After magnetization at room temperatures in a field of 100 kilo-oersteds, its magnetic properties were determined. It was then aged at a temperature of 900° C. for a period of 12 hours, and after magnetization at room temperatures in a field of 100 kilo-oersteds, the magnetic properties of the heat-aged bar were determined. The results were as follows:

|  | Sintered product | Aged (900° C.) sintered product |
|---|---|---|
| Saturation induction $B_s$ | 10,490 | 10,500 |
| Remanent induction $B_r$ | 9,500 | 9,500 |
| Coercive force $H_c$ | −6,900 | −8,900 |
| Intrinsic coercive force $H_{ci}$ | −17,600 | −17,800 |
| Maximum energy product $(BH)_{max}$ | 19.5 | 21.8 |

Standard wet chemical analysis of the aged sintered product showed it to be comprised of 63.3% by weight cobalt, 20.2% by weight samarium and 15.9% by weight praseodymium.

EXAMPLE 5

A base alloy was formed from 15% by weight lanthanum, 16.8% by weight samarium and 68.2% by weight cobalt. An additive alloy was formed from 40.8% by weight cobalt and 59.2% by weight samarium. The base and additive alloys were each in the form of a powder and were blended to form a mixture having a composition of about 60.8% by weight cobalt, 10.7% by weight lanthanum and 28.5% by weight samarium.

The procedure used in forming the sintered product and magnetizing it was the same as that set forth in Example 4. The product was heat-aged at a temperature of 900° C. for 16 hours. After magnetization at room temperatures in a field of 100 kilo-oersteds, the magnetic properties of the heat-aged bar were determined. The results were as follows:

|  | Sintered product | Aged (900° C.) sintered product |
|---|---|---|
| Remanent induction $B_r$ (gauss) | 7,000 | 6,800 |
| Coercive force $H_c$ (oersteds) | −6,350 | −6,500 |
| Intrinsic coercive force $H_{ci}$ (oersteds) | −23,700 | −28,000 |
| Maximum energy product $(BH)_{max}$ (10⁶ g.-oe.) | 11.6 | 11.0 |

EXAMPLE 6

In this example, two techniques were used to carry out heat-aging after sintering.

Specifically, a base alloy melt and an additive alloy melt were formed under purified argon by arc-melting and were cast into ingots. The base alloy was formed from 66 weight percent cobalt, 17 weight percent samarium and 17 weight percent cerium-misch metal. The additive alloy was formed from 39.9 weight percent cobalt and 60.1 weight percent samarium. Each ingot was formed into a powder in the same manner as disclosed in Example 1 ranging in size from approximately 1 to about 10 microns in diameter with an average size of about 6 microns.

1596.2 grams of the base alloy were admixed with 153.8 grams of the additive alloy by tumbling to form a substantially thorough mixture of 63.25 weight percent cobalt, 21.05 weight percent samarium and 15.70 weight percent cerium rich misch metal.

A portion of the mixture was placed in a rubber tube and magnetically aligned therein by an aligning magnetizing field of 60 kilo-oersteds and then compressed under a pressure of 200K p.s.i. to form Bar A. A second bar, Bar B, was formed from a second portion of the mixture in the same manner. Each bar weighed about the same and had substantially the same dimensions, i.e. each had a diameter of about 0.3 inch and was about one inch long.

Bar A was sintered at a temperature of 1075° C. for one hour. It was then retort cooled to room temperature, and reheated in the furnace to the heat-aging temperature of 950° C. It was maintained at 950° C. for 15 hours and then retort cooled to room temperature.

Bar B was sintered at a temperature of 1075° C. for one hour. It was then furnace cooled at a rate of 3.3° C. per minute to the heat-aging temperature of 950° C. It was maintained at 950° C. for 15 hours and then retort cooled to room temperature.

After Bars A and B were magnetized in the same manner at room temperature in a magnetizing field of 100 kilooersteds, their magnetic properties were determined to be as follows:

|  | Bar A: After sintering, cooled to room temperature | Bar B: After sintering, furnace cooled to heat-aging temperature |
|---|---|---|
| Coercive force $H_c$ (oersteds) | −4.21 | −7.81 |
| Intrinsic coercive force $H_{ci}$ (oersteds) | −4.9 | >−15 |
| Saturation induction $B_s$ (gauss) | 9.5 | 9.3 |
| Remanent induction $B_r$ (gauss) | 9.1 | 8.8 |
| Maximum energy product $(BH)_{max}$ (gauss-oersted) | 17.7 | 18.9 |
| Density | 8.18 | 8.17 |
| Packing, percent | 97.4 | 97.3 |
| Alignment | 0.985 | 0.974 |
| Squareness factor $H_k$ | −3.8 | −7.6 |

The above magnetic properties of Bars A and B illustrate the significant improvements obtained when the sintered product is heat-aged by slow cooling in a furnace to the proper aging temperature. For example, the normal coercive force $H_c$ is almost doubled and the intrinsic coercive force $H_{ci}$ is more than tripled. The squareness factor $H_k$ is also significantly increased indicating a significant increase in resistance to demagnetization. Specifically, the term $H_k$ helps characterize the squareness of the $4\pi M$ demagnetization curve. $H_k$ is the demagnetizing field required to drop the magnetization 10 percent below the remanence $B_r$. That is, $4\pi M_k = .9\ B_r$, and $H_k$ is the corresponding field strength. $H_k$ is a useful parameter for evaluating demagnetization resistance.

What is claimed is:

1. A process for producing a heat-aged sintered cobalt-rare earth intermetallic product which comprises providing a sintered cobalt-rare earth intermetallic product of compacted particulate cobalt-rare earth intermetallic material, said sintered product having a density ranging from about 87 to 100 percent and consisting essentially of a composition ranging from a single solid $Co_5R$ phase to that consisting essentially of $Co_5R$ phase and a second phase of solid $CoR$ in an amount of up to about 30 percent by weight of the product and richer in rare earth metal content than said $Co_5R$ phase, and heat-aging said product in an atmosphere in which said product is substantially inert at an aging temperature within 400° C. below the temperature at which said product was sintered to precipitate $CoR$ phase richer in rare earth metal content than said $Co_5R$ phase in an amount sufficient to increase the intrinsic and/or normal coercive force of said product by at least 10 percent, where R is a rare earth metal or metals.

2. A process according to claim 1 wherein R is samarium.

3. A process according to claim 1 wherein R is samarium-cerium misch metal.

4. A process according to claim 1 wherein said heat-aging of said product is carried out at an aging temperature ranging from 300 to 100° C. below the temperature at which it was sintered.

5. A process according to claim 1 wherein said heat-aging of said product is carried out by furnace cooling said product from the temperature at which it was sintered to said aging temperature at a rate ranging from about 0.1 to 20° C. per minute.

6. A process according to claim 1 which includes the step of subjecting the resulting heat-aged sintered product to a magnetizing field to produce a magnetized sintered product.

7. A process according to claim 1 which includes the steps of crushing the resulting heat-aged sintered product into particles, and bonding the resulting particles of sintered product to a matrix material.

8. A process according to claim 7 which includes the step of subjecting said bonded particles in said matrix material to a magnetizing field to magnetize said bonded particles.

9. A heat-aged sintered product of compacted particulate cobalt-rare earth intermetallic material, said sintered product having a density ranging from about 87 percent to 100 percent and consisting essentially of $Co_5R$ intermetallic phase and a precipitated CoR phase richer in rare earth metal content than said $Co_5R$ phase in an amount sufficient to increase intrinsic and/or normal coercive force by at least ten percent, where R is a rare earth metal or metals.

10. A heat-aged sintered product of compacted particulate cobalt-rare earth intermetallic material, said sintered product having a density ranging from about 87 to 100 percent and consisting essentially of $Co_5R$ intermetallic phase, a solid CoR phase richer in rare earth metal content than said $Co_5R$ phase in an amount up to about 30 percent by weight of said product, and a precipitated CoR phase richer in rare earth metal content than said $Co_5R$ phase in an amount sufficient to increase intrinsic and/or normal coercive force by at least ten percent, where R is a rare earth metal or metals.

11. A heat-aged sintered product according to claim 9 wherein R is samarium.

12. A heat-aged sintered product according to claim 9 wherein R is samarium-misch metal.

13. The heat-aged sintered product according to claim 9 wherein R is samarium-praseodymium.

14. A heat-aged sintered product according to claim 9 wherein R is samarium-lanthanum.

15. The heat-aged product of claim 9 in particulate form.

16. A permanent magnet formed from the heat-aged sintered product of claim 9.

17. A permanent magnet formed from the heat-aged sintered product of claim 10.

18. A permanent magnet formed from the particulate heat-aged sintered product of claim 15.

19. A permanent magnet formed from the particulate product of claim 15 and a flexible bonding medium.

20. A permanent magnet formed from the particulate product of claim 15 distributed in a metal matrix.

References Cited

UNITED STATES PATENTS

| | | | |
|---|---|---|---|
| 3,560,200 | 2/1971 | Nesbitt et al. | 148—31.57 X |
| 3,540,945 | 11/1970 | Strnat et al. | 75—170 X |
| 3,546,030 | 12/1970 | Buschow et al. | 148—31.57 |
| 3,523,836 | 8/1970 | Buschow et al. | 148—31.57 |

L. DEWAYNE RUTLEDGE, Primary Examiner

G. K. WHITE, Assistant Examiner

U.S. Cl. X.R.

75—200, 208; 148—31.57, 103, 126